United States Patent [19]

MacConochie et al.

[11] 4,456,208
[45] Jun. 26, 1984

[54] SHELL TILE THERMAL PROTECTION SYSTEM

[75] Inventors: Ian O. MacConochie, Yorktown; Ashby G. Lawson, Tabb; H. Neale Kelly, Yorktown, all of Va.

[73] Assignee: The United States of America as represented by the Administrator of the National Aeronautics and Space Administration, Washington, D.C.

[21] Appl. No.: 435,511

[22] Filed: Oct. 20, 1982

[51] Int. Cl.³ .............................................. B64G 1/58
[52] U.S. Cl. ........................... 244/158 A; 244/117 A; 220/306
[58] Field of Search .................. 244/158 A, 160, 163, 244/117 A, 121; 220/306, 445; 52/404, 405, 506, 513, 805, 809

[56] References Cited

U.S. PATENT DOCUMENTS

| | | | |
|---|---|---|---|
| 2,585,082 | 2/1952 | Bollinger, Jr. | 52/804 |
| 3,052,431 | 9/1962 | Compton | 244/117 A |
| 3,130,940 | 4/1964 | Erb et al. | 244/117 A |
| 3,152,548 | 10/1964 | Schwartz | 52/506 |
| 3,514,915 | 6/1970 | Johnson | 52/404 |
| 3,811,597 | 5/1974 | Frankenberg | 220/306 |
| 4,086,737 | 5/1978 | Byrd, Jr. | 52/506 |
| 4,107,892 | 8/1978 | Bellem | 52/404 |
| 4,124,732 | 11/1978 | Leger | 244/121 |
| 4,155,482 | 5/1979 | Swaney | 52/404 |

FOREIGN PATENT DOCUMENTS 1272591  5/1972  United Kingdom .......... 244/117 A

Primary Examiner—Trygve M. Blix
Assistant Examiner—Rodney Corl
Attorney, Agent, or Firm—Howard J. Osborn; John R. Manning; Wallace J. Nelson

[57] ABSTRACT

A reusable, externally applied thermal protection system is disclosed and functions by utilizing shell tile structure 10 which effectively separates its primary functions as an insulator and load absorber. Tile 10 consists of structurally strong upper and lower metallic shells 12,16 manufactured from materials meeting the thermal and structural requirements incident to tile 10 placement on the spacecraft. A lightweight, high temperature package of insulation 26 is utilized in upper shell 12, while a lightweight, low temperature insulation 28 is utilized in lower shell 16. Assembly of tile 10, which is facilitated by self-locking mechanism 20, may occur subsequent to installation of lower shell 16 on the spacecraft structural skin 30.

5 Claims, 8 Drawing Figures

SHELL TILE THERMAL PROTECTION SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a reusable, externally applied thermal protection system for use on aerospace vehicles subject to high thermal and mechanical stresses, and more particularly to a shell tile structure which effectively separates its primary functions as an insulator and load absorber.

Because space vehicles are subject to temperature extremes during ascent and re-entry, it is customary to provide the vehicle with a heat shield designed to protect the vehicle metallic substructure. The advent of the Space Shuttle initiated the need for a reusable, nonablative thermal protection system (TPS). The orbiter vehicle basically utilizes a conventional, skin-stringer aluminum aircraft structure. The properties of aluminum, however, dictate that the maximum operating temperature of the substructure not exceed 350° F. In addition, the vehicle is subjected to multiple aerodynamic loads during flight, including aerodynamic pressure gradients and shocks, buffet and gust loads, acoustic pressure loads caused by boundary layer noise and concomittant substructure motion. Therefore, the TPS used must protect the aluminum substructure from high surface temperatures and at the same time withstand the thermal cycles and environmental loads of space flight.

The ceramic tile utilized on the initial flights of the shuttle, however, has relatively low strength and a low coefficient of thermal expansion as compared to metals. The relatively low tile strength precludes use for load bearing applications and dictates that the tiles be secured to the protected structure by a means which will minimize transfer of strains from the metal structure to the tile. Because of its homogeneous structure and brittle character, the ceramic tile has a strain to fracture performance considerably below the yield strain of aluminum and, as a result, must be monitored carefully for surface erosion, fraying and cracking. In addition, its low coefficient of thermal expansion is a deterrent to the tile ability to protect against gap heating.

It is preferable, therefore, to design a TPS which effectively separates its functions as an insulator and load absorber. This separation of functions allows flexibility in designing a TPS which can withstand thermal and mechanical stresses more effectively, without adding to the weight of the vehicle.

Accordingly, it is an object of this invention to provide an improved thermal protection system for aerospace vehicles.

Another object of this invention is to provide a reusable, externally applied thermal protection system which effectively separates its functions as an insulator and load absorber.

Another object of this invention is to provide a durable thermal protection system which utilizes a structurally strong outer shell to assume loads and a lightweight, thermally efficient insulation internally to resist heat flow.

Another object of this invention is to provide a thermal protection system which substantially reduces gap heating of the aerospace vehicle structure.

Still another object of this invention is to provide a thermal protection system which can be readily altered to meet desired thermal and mechanical performance.

Yet another object of this invention is to provide a thermal protection system which is strong in shear and tension, thereby permitting it to be directly connected to the substructure.

Still another object of this invention is to provide a thermal protection system which has a low parts count and is easily manufactured, installed, replaced and repaired.

SUMMARY OF THE INVENTION

The foregoing and other objects of the invention are achieved by providing a reusable, externally applied thermal protection system on an aerospace vehicle comprising a shell tile structure which effectively separates its primary functions as an insulator and load absorber. The system utilizes a plurality of tiles, each of which consists of structurally strong upper and lower metallic shells manufactured from materials meeting the thermal and structural requirements incident to tile placement on the spacecraft. A lightweight, high temperature package of flexible insulation is utilized in the upper/outer shell, while a lightweight, low temperature flexible insulation is utilized in the lower/inner shell. Assembly of the tile, which is facilitated by self-locking wedges on both shells, may occur subsequent to installation of the lower shell on the spacecraft structural skin.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DETAILED DESCRIPTION OF THE INVENTION

Figure 1:
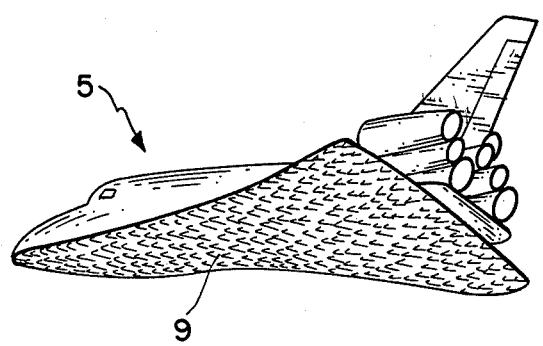
FIG. 1 is a view of an aerospace vehicle utilizing the tile thermal protection system of the present invention.

Referring now to the drawings, FIG. 1 illustrates an exemplary aerospace vehicle, generally designated by reference numeral 5, that utilizes a thermal protection system 9 made up of multiple tiles 10 of the present invention. Because vehicle 5 is subject to extreme temperatures during re-entry into the Earth atmosphere as well as during other hypervelocity flight, it requires thermal protection in varying degrees throughout. Consequently, the area on the nose cap and leading edges of the wings must withstand the effects of temperatures in excess of 2300° F. Most of the lower surface of vehicle 5 must withstand temperatures in the range of 1200° F. to 2300° F. The side surface of the tail, and the forward top and sides of vehicle 5 must withstand temperatures in the range of 700° F. to 1200° F. Finally, the upper surface of the wings and the top and rearward sides of vehicle 5 must withstand temperatures up to 900° F.

Figure 3:
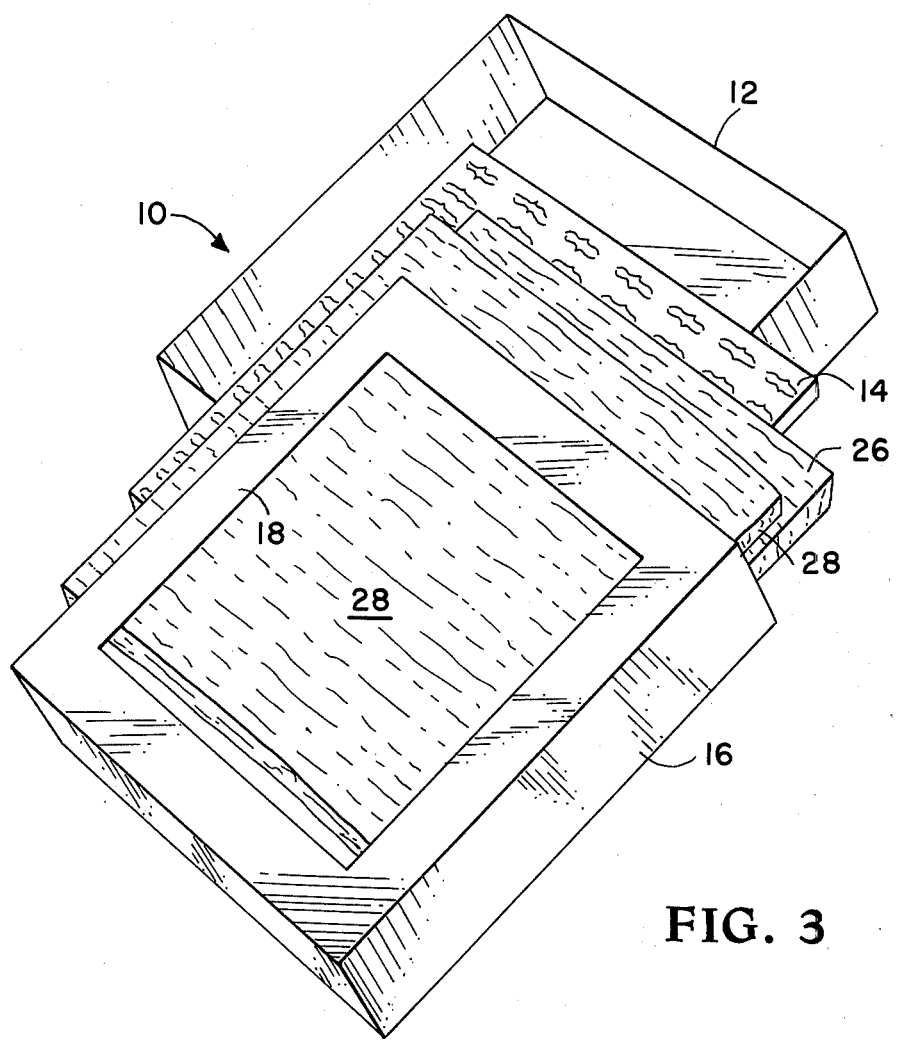
FIG. 3 is an exploded bottom view of the components of the shell tile structure of FIG. 2 prior to assembly.
Figure 2:
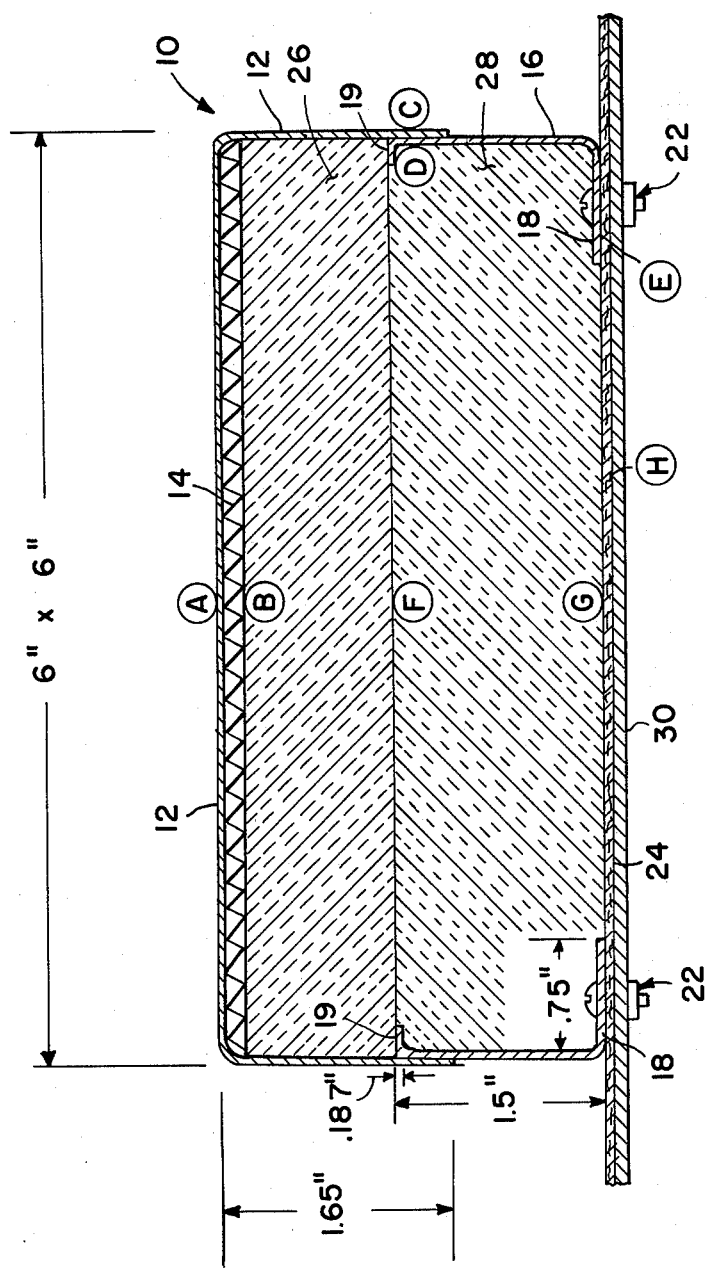
FIG. 2 is a cross-sectional view of an individual assembled shell-tile structure of the present invention utilized by the aerospace vehicle of FIG. 1 and taken along line II—II of FIG. 4.
Figure 4:
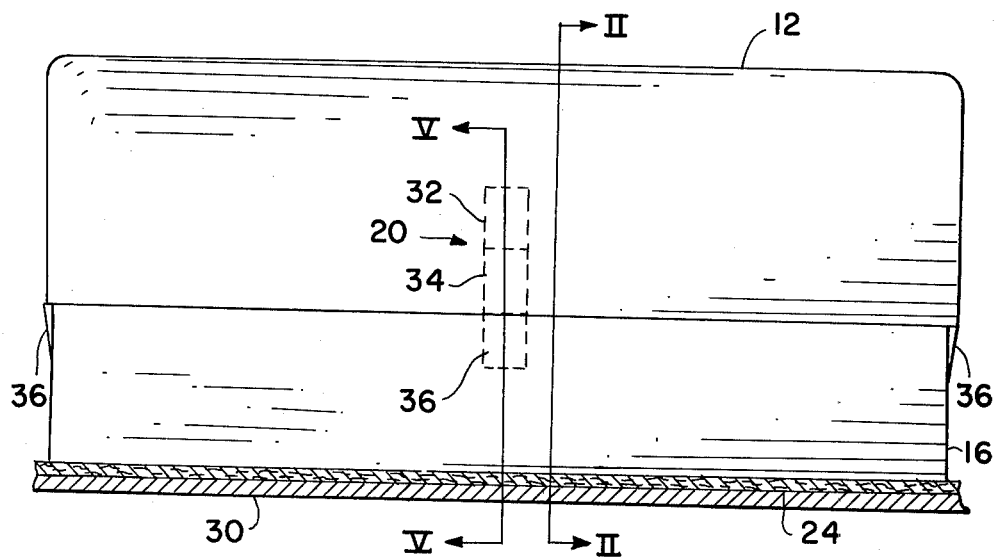
FIG. 4 is a schematic front view of an assembled tile illustrating the relative size and location of the self-locking mechanism utilized in the present invention.
Figures 5, 6, 6A:
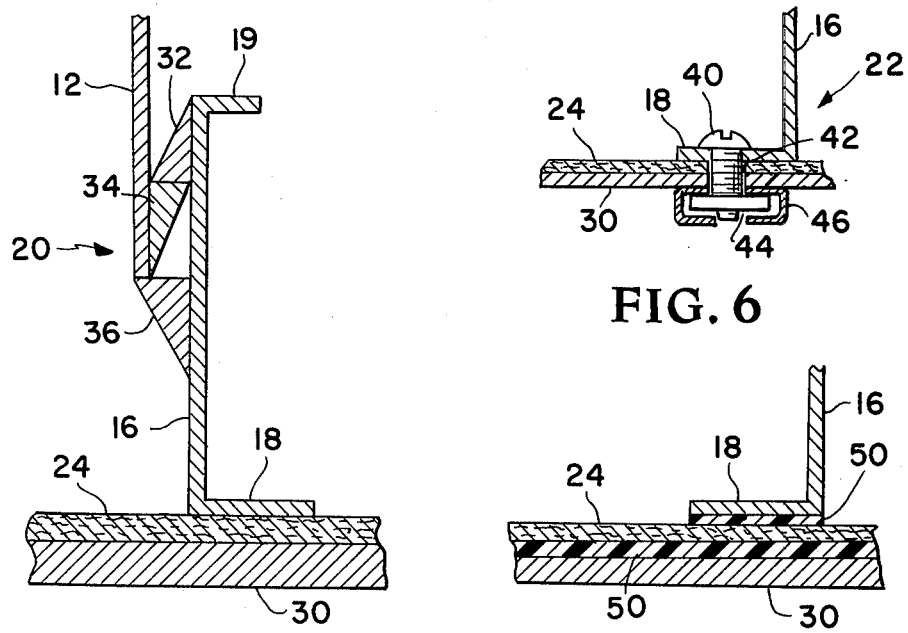
FIG. 5 is an enlarged part-sectional view of the self-locking mechanism taken along line V—V of FIG. 4.
FIG. 6 is a part-sectional view of the floating nut plate connection utilized in one embodiment of the present invention.
FIG. 6a is a cross-sectional view of the adhesive connection utilized in another embodiment of the present invention.

Referring now more particularly to FIGS. 2 and 3, there is shown an individual shell tile structure 10 of the present invention. Tile 10 consists primarily of a structurally strong upper shell or cap 12 and a lower shell or casing 16 which utilize high temperature insulation 26 and intermediate temperature insulation 28, respectively, in their interior cavities and are connected by self-locking mechanism 20 (FIGS. 4 and 5).

Upper and lower metallic shells 12, 16 function primarily to assume the aerodynamic loads to which the spacecraft is subject during flight. Basically rectangular in shape, shells 12, 16 are disposed opposite one another so as to define an interior cavity between them. Upper shell 12 is slightly larger than and fits over lower shell 16, completely enclosing the interior cavity. Also, in the preferred embodiment, most of the bottom of lower shell 16 is removed, leaving only retaining lip 18 to facilitate connection to the vehicle substructure 30. This decreases the overall weight of tile 10, which may be fabricated into any external shape required for the particular area of the spacecraft to be insulated.

Because tile 10 is exposed directly to the external environment, upper and lower shells 12, 16 must be manufactured from materials which meet the thermal and structural requirements incident to tile 10 placement on the spacecraft. Candidates for upper shell 12 include titanium and titanium alloys which typically retain their structural characteristics up to approximately 750° F.; nickel alloys, such as René-41, which are typically effective up to approximately 1600° F. (Reneé-41 is commercially available from General Electric and other suppliers); columbium, effective to approximately 2200° F.; and reinforced carbon composites, effective to approximately 3000° F. Candidates for lower shell 16 include titanium, because of its low weight and conductivity, and graphite/polyimide composites, among others. In a specific example tile with shells 12 and 16 formed of René-41, a material thickness of 0.004" proved adequate. Other materials would be expected to be within the thickness range of 0.004 to 0.100. The latter thickness applying to low density organic composites.

Another objective of utilizing structurally strong metallic shells 12, 16 is to reduce gap heating between tiles 10. As a metal or any other material is subject to increasing temperatures, it will expand as a function of its coefficient of linear thermal expansion. Because of its low coefficient of linear thermal expansion, the ceramic tile presently used on the Space Shuttle lags considerably behind the expansion of the aluminum substructure 30 when exposed to extreme temperatures. Therefore, gaps occur between the tiles, and the substructure 30 is exposed to the high temperature environment. Tile 10 of the present invention is designed to reduce this effect substantially. By utilizing materials with a coefficient of linear thermal expansion similar to that of the aircraft substructure 30, tile 10 will expand coextensively with substructure 30 during periods of high thermal stress. This expansion will effectively close the gaps and reduce direct heating of substructure 30.

To achieve this result, materials must be chosen and tile 10 placed such that upper shells 12 of adjoining tiles 10 are closest to each other at the moment of maximum shell 12 expansion. The following calculations illustrate the method of determining the proper gap at installation.

The general expansion of any material is defined as $$S = \alpha L \Delta T \tag{1}$$

where, $\alpha$ = coefficient of linear thermal expansion
$L$ = length of the material sample
$\Delta T$ = temperature differential ($T_{final} - T_{initial}$).

Therefore, the size of the gap resulting from coextensive expansion of tile 10 and substructure 30 is defined as $$S_{gap} = S_{tile} - S_{structure}. \tag{2}$$

Because tile 10 will expand before substructure 30, the calculation must be approached in two stages. First, the initial expansion of tile 10 must be determined. This calculation represents what typically occurs at the beginning of entry. In this specific example, upper shell 12 is constructed of René 41 and substructure 30 of aluminum:

$$S_1 = S\text{Rene}_1 - S\text{Aluminum}_1 \tag{3}$$

$$= \alpha_R L_R \Delta T_R - \alpha_A L_A \Delta T_A$$

$$= [9.3 \times 10^{-6} \text{ in/in °F. } (900° \text{ F.} - 70° \text{ F.}) \, 6 \text{ in}] -$$

$$[13.7 \times 10^{-6} \text{ in/in °F. } (110° \text{ F.} - 70° \text{ F.}) \, 6 \text{ in}]$$

$$= .0324 \text{ in.}$$

Therefore, shell 12 will differentially expand 0.0324 inch at the beginning of entry and should be so spaced at installation. By installing at this interval, shells 12 of adjoining tiles 10 will touch upon maximum expansion. (This calculation presupposes that when upper shell 12 reaches 900° F., substructure 30 is approximately 110° F. Of course, this is a function of the type of entry trajectory and insulation 26,28 utilized, and the location on the vehicle.)

By the end of flight, however, aluminum substructure 30 has had a chance to heat up and expand, thereby pulling tiles 10 away from each other and causing a gap therebetween. This counter expansion assumes that substructure 30 heats to 250° F., and is calculated as follows:

$$S_2 = S\text{Rene}_2 - S\text{Aluminum}_2 \tag{4}$$

$$= [9.3 \times 10^{-6} \text{ in/in °F. } (900° \text{ F.} - 70° \text{ F.}) \, 6 \text{ in}] -$$

$$[13.7 \times 10^{-6} \text{ in/in °F. } (250° \text{ F.} - 70° \text{ F.}) \, 6 \text{ in}]$$

$$= .0315 \text{ in.}$$

Therefore, if the gap at installation is 0.0324 in., the gap at the end of entry will be $$S_{gap} = S_1 - S_2$$
$$= .0324 - .0315$$
$$= .0009 \text{ in.}$$

By utilizing materials with different coefficients of linear thermal expansion, and changing tile 10 placement, this gap can be altered accordingly and the effect of gap heating substantially reduced.

Within shells 12,16 are placed several layers of lightweight, thermally efficient insulation. Typically, upper shell 12 is filled with one or more types of high temperature insulation 26 which has high density and remains effective at very high temperatures. One example is Micro-Quartz®, manufactured by the Johns-Manville Aerospace Company. This 98.5+% silica fibrous insulation has a density of 3.5 lb/cu ft and a thermal conductivity of 0.83 Btu-in/sq ft-hr-°F. at 1000° F. Lower shell 16, on the other hand, utilizes insulation 28 which is lighter, less dense and remains effective only to certain intermediate temperatures. One example is a 98.5+% silica fibrous insulation with a density of 1.1 lb/cu ft and a thermal conductivity of 0.48 at 600° F.

Because upper and lower shells 12, 16 bear the structural loads, the choice of insulation 26, 28 is dependent only on the temperature profile between the outer surface of upper shell 12 and substructure 30 sought to be achieved through tile 10 use. Therefore, lightweight but thermally efficient insulation may be utilized. In addition, each cap may use several layers of insulation 26,28, each with different properties, once again depending only on the desired thermal performance of tile 10. In determining the desired thermal characteristics of any particular tile 10, reference must be made to the exact location of tile 10, as the degree of protection required will change with relative position on vehicle 5.

Referring to FIGS. 4 and 5, the self-locking mechanism 20 is more clearly illustrated. Mechanism 20 functions to hold upper shell 12 in place once tile 10 is assembled. Basically, it utilizes tapered wedges 32,34 disposed, respectively, on each side of upper and lower shells 12,16. Upper wedges 34 are disposed on the inner surfaces of the sides to upper shell 12 with their tapered edge pointing downwards, while lower wedges 32 are disposed on the outer surface of the sides to lower shell 16 with their tapered edge pointing upwards. Wedges 32,34 are disposed opposite one another so as to allow upper wedge 34 to traverse over lower wedge 32 as downward pressure is applied to upper shell 12. Once upper wedge 34 is completely beyond lower wedge 32, shells 12,16 are locked in place and no reverse movement can occur. The material forming shell 12 has inherent spring action physical property characteristics permitting pressure expansion thereof and spring retraction and retention once the wedges 34 move beyond lower wedges 32. To prohibit further downward movement of upper shell 12, mechanism 20 utilizes supporting wedges 36 disposed on the outer surface of lower shell 16. Although the number of wedges may be varied, in the preferred embodiment a pair of wedges 32,34 was employed on each shell side. One support wedge 36 was employed with each pair of lock wedges. These wedge numbers could vary with for example, only two pair of lock wedges 32,34 being provided (one pair on each of opposite sides) with four support wedges 36 still employed (one on each shell side). On a tile 10 having six inch square sides, wedges 32, 34 and 36 of one-quarter inch width by one-quarter inch long, by one-sixteenth inch thick, proved adequate.

Mechanism 20 permits easy assembly and maintenance of tile 10. Because upper shell 12 can be readily removed (via the spring action of the side portions thereof), the type of insulation 26,28 utilized may be changed to accommodate any anticipated change of conditions. Therefore, the operational characteristics of tile 10 may be readily altered by replacing the insulation 26,28 with alternate types and thicknesses of insulation and/or by changing the material and gauges of upper and lower shells 12,16. To further enhance the insulating qualities of a tile additional non-structural loose sheets of dimpled and undimpled foils of approximately 0.001 inch thick of high emissivity metals can be added to act as radiation barriers above insulation 26 and below upper shell 12. High temperature tapes can also be bonded around the perimeter of lower shell 16 in contact area between upper and lower shells 12,16 to further enhance insulating qualities of the tile. None of the above changes require alteration of the thickness of the tile, the outer moldline of the vehicle, or basic design of the tile. In addition, this design permits assembly of tile 10 to take place subsequent to disposition of lower shell 16 on substructure 30. Once lower shell 16 is attached, insulation 26,28 may be inserted and upper shell 12 attached by applying downward pressure until self-locking mechanism 20 operates. Conversely, any individual tile can be removed by first forcing thin wedges between the tiles until the wedge rests between lower shell 16 to release self-locking mechanism 20.

Because shells 12, 16 are strong in shear and tension, there is no need to isolate tile 10 from the strain of aluminum substructure 30. Therefore, lower shell 16 may be attached directly to substructure 30. One means of facilitating installation is the floating nut plate apparatus 22 shown in FIG. 6. Apparatus 22 utilizes a retention plate 46 which is riveted, welded or otherwise securely fastened to the inner surface of substructure 30. Within plate 46 is nut 44 which is free to move laterally. Because of the shape of plate 46, i.e., flat surfaces abutting flat edges of nut 40, nut 44 may not move rotationally. Bolt 40 is placed through retention lip 18 of lower shell 16 and attached to nut 44 through bore 42, lower shell 16 being then secured in place. Apparatus 22 is typically utilized in each corner of lower shell 16. Because bore 42 is slightly larger in diameter than bolt 40, apparatus 22 may move laterally during periods of thermal or mechanical expansion. By permitting lateral movement, apparatus 22 can effectively accommodate any thermal expansion experienced by lower shell 16 without causing additional strain between lower shell 16 and substructure 30.

Another means by which lower shell 16 may be attached to substructure 30 is illustrated in FIG. 6a wherein an elastomeric room-temperature-vulcanizing adhesive (RTV) 50 is substituted for lock apparatus 22. Adhesive 50 retains its adhesive characteristics up to approximately 450° F.–500° F. and may be used either as the sole connecting means or in conjunction with apparatus 22. Specific example adhesives meeting this criteria are General Electric's RTV-560 and Hysol Company's EA-934 Epoxy. Although not required, a strain isolation pad (SIP) 24 was employed in the preferred embodiment and interposed between lower shell 16 and substructure 30 prior to installation of either of the above-mentioned connecting means. Strain isolation pad 24 reduces any residual interstructural strain caused by expansion of substructure 30 and effectively hinders the flow of heat from the bottom of lower shell 16 to substructure 30. Pad 24 may comprise, for example, one or more layers of Nomex felt. A tradename of the DuPont Company, Nomex is a poly(1,3-phenylene-isophtalamide).

Figure 7:
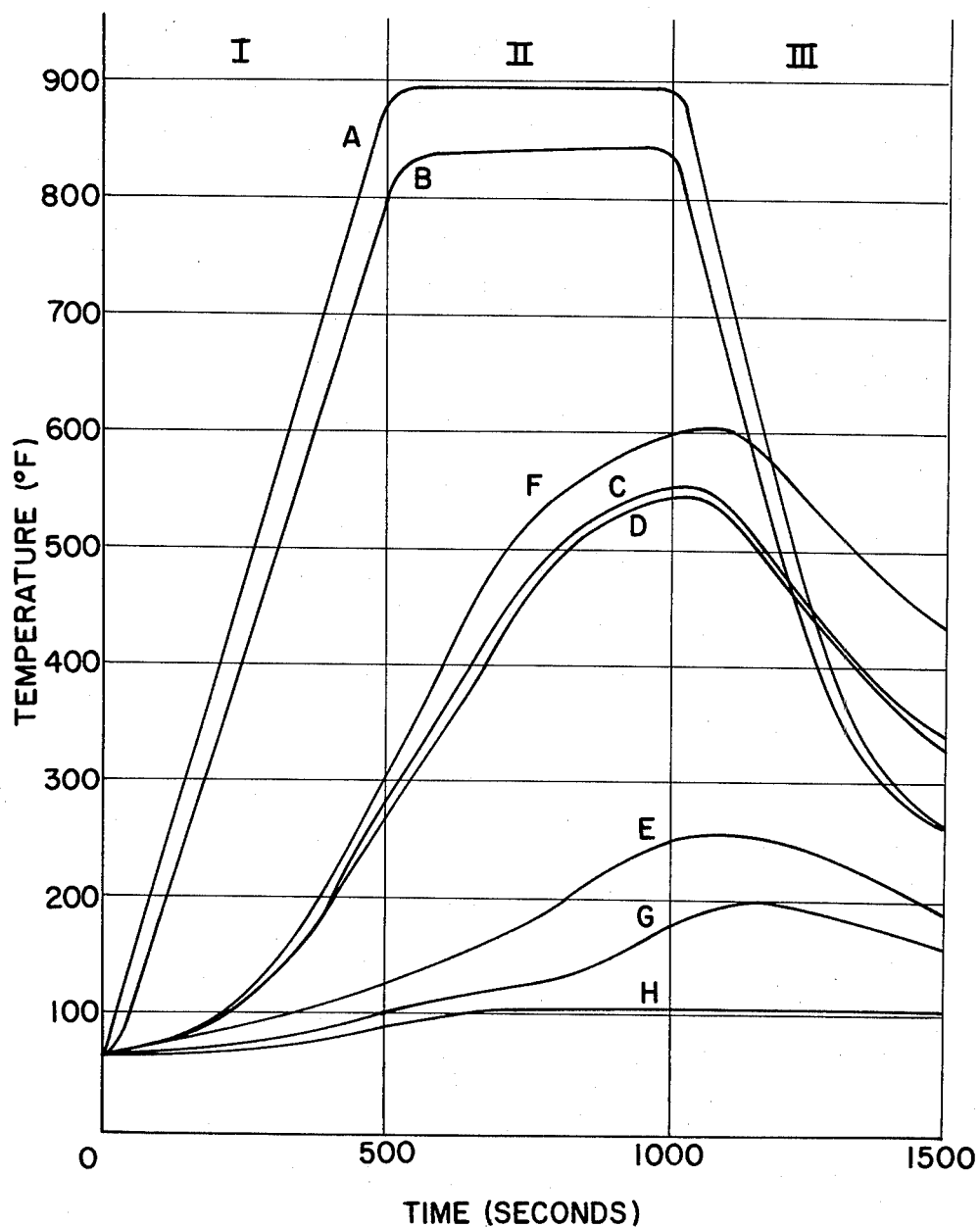
FIG. 7 is a graphic illustration of the response of the present invention to artificially induced conditions of extreme temperature at the specific points on the tile as designated in FIG. 2.

FIG. 7 is a graphic illustration of the response of a typical tile 10 to artificially induced conditions of extreme temperatures. Tile 10 utilized to gather this data is that shown in FIG. 2. Upper shell 12 is constructed of 0.004 inch thick René 41 and has a square outer surface measuring 6 inches×6 inches and sides measuring 1.65 inch. In the preferred configuration a dimpled sheet 14 of 0.004 inch René 41 is electron beam welded to and within upper shell 12 and serves to reduce radiation heat transfer and to add stiffness and strength to the outer surface of upper shell 12. High temperature insulation 26 utilized in upper shell 12 is Micro-Quartz°, manufactured by Johns-Manville Aerospace Company. This insulation 26 comprises 98.5+% pure silica fibers and has a density of 3.5 lb/cu ft. Lower shell 16 is constructed of 0.004 inch thick titanium and has sides measuring 1.5 inch and retaining lip 18 measuring 0.75 inch. Lower shell 16 also utilizes an upper retainer 19 measuring 0.187 inch which adds strength to lower shell 16. A strain isolation pad 24 comprising a layer of 0.2 inch thick Nomex felt is interposed between lower shell 16 and substructure 30. Connection of lower shell 16 to substructure 30 is facilitated by floating nut plate apparatus 22. The low temperature insulation 28 utilized comprises 98.5+% pure silica fibers with a density of 1.1 lbs/cu ft.

The curves in FIG. 7 correspond to the labelled points in FIG. 2 and illustrate the temperature at that point as a function of time. Therefore, curve A is a plot of temperature vs time for point A, curve B is a plot for point B, etc. Initially, tile 10 is subjected to steadily increasing temperatures until upper shell 12 reaches 900° F. (Section I). This temperature is then maintained for 500 seconds while the effect on the entire tile structure 10 is monitored (Section II). The temperature is then allowed to drop off (Section III). These results indicate approximately a 300° F. drop in temperature through the upper layer of insulation 26, and a further drop of approximately 400° F. through low temperature insulation 28. At no time does the temperature of the aircraft substructure 30 exceed approximately 110° F. By changing the insulation 26,28 utilized in the interior cavity of tile 10, this temperature profile may be altered accordingly. In addition, by utilizing high temperature glass insulation tape between shells 12,16 at their interface, the flow of heat to substructure 30 may be hindered further.

Although the invention has been described relative to a specific application thereof, it is not so limited and numerous variations and modifications will be readily apparent to those skilled in the art in light of the above teachings. It is therefore to be understood that within the scope of the appended claims, the invention may be practiced otherwise than as specifically described.

What is claimed as new and desired to be secured by Letters Patent of the United States is:

1. A shell tile adapted for use as a component part of a reusable, externally applied thermal protection system on the skin of aerospace vehicles and the like comprising:
   upper and lower metallic shells for assuming structural loads,
   each of said upper and said lower shell having a base and side portions,
   said metallic shells being constructed from materials able to withstand temperatures of up to approximately 2300° F., said upper shell base being exposed directly to the high temperature environment during vehicle flight;
   at least one dimpled, lightweight metallic sheet being attached interiorly within said upper shell adjacent the base thereof, thereby adding stiffness and strength to said upper shell;
   each of said upper and said lower shell having a base and side portions,
   said lower shell base being attached to the vehicle skin and said upper shell being disposed opposite and joined at the side portion thereof to said lower shell, defining an interior cavity therebetween;
   insulating means interposed in said interior cavity; and
   said insulation means including at least one layer of lightweight high temperature insulation inserted into said upper shell and at least one layer of lightweight intermediate temperature insulation inserted into said lower shell.

2. A shell tile adapted for use as a component part of a reusable, externally applied thermal protection system on the skin of aerospace vehicles and the like comprising:
   upper and lower metallic shells for assuming structural loads,
   each of said upper and said lower shell having a base and side portions,
   said lower shell base being attached to the vehicle skin and said upper shell being disposed opposite and joined at the side portion thereof to said lower shell, defining an interior cavity therebetween;
   insulating means interposed in said interior cavity;
   said insulation means including at least one layer of lightweight high temperature insulation inserted into said upper shell and at least one layer of lightweight intermediate temperature insulation inserted into said lower shell;
   said high temperature / insulation comprising a 98.5+% pure silica fiber with a density of 3.5 lb/cu ft; and
   said intermediate temperature insulation comprising a 98.5+% pure silica fiber with a density of 1.1 lb/cu ft.

3. A shell tile adapted for use as a component part of a reusable, externally applied thermal protection system on the skin of aerospace vehicles and the like comprising:
   upper and lower metallic shells for assuming structural loads,
   each of said upper and said lower shell having a base and multiple side portions,
   said lower shell base being attached to the vehicle skin and said upper shell being disposed opposite and joined at the side portion thereof to said lower shell, defining an interior cavity therebetween;
   insulating means interposed in said interior cavity;
   said lower shell being telescopically received by said upper shell and including locking means for joining the shell side portions in telescoped connection;

said locking means utilizing a self-locking mechanism including at least one upper tapered wedge being attached to the outer surface of at least two sides of said upper shell, at least one lower tapered wedge being attached to the outer surface of an equal number of sides of said lower shell, said upper shell wedges having a flat upper surface and a tapered edge pointing downwards and said lower wedges having a flat lower surface and a tapered edge pointing upwards;

said upper and said lower wedges being disposed opposite one another so as to allow said upper wedge to traverse over said lower wedge as downward pressure is applied to said upper shell causing said upper shell sides to spread, until said upper wedge is completely beyond said lower wedge, thereby permitting the flat surfaces thereof to contact for prohibiting reverse movement of said shells due to the inherent spring force exerted thereon by said upper shell sides;

restraining means for prohibiting further downward movement of said upper shell once said tapered wedges are locked in place;

said restraining means comprising supporting wedges disposed on the outer surface of said sides of said lower shell, thereby impeding further downward movement of said upper shell.

4. A shell tile adapted for use as a component part of a reusable, externally applied thermal protection system on the skin of aerospace vehicles and the like comprising:

upper and lower metallic shells for assuming structural loads, each of said upper and said lower shell having a base and side portions, said lower shell base being attached to the vehicle skin and said upper shell being disposed opposite and joined at the side portion thereof to said lower shell, defining an interior cavity therebetween;

insulating means interposed in said interior cavity;

connecting means for attaching said lower shell base to the vehicle skin while permitting some relative movement therebetween;

said connecting means including a floating nut plate integral with the vehicle skin, and bolting means integral with said lower shell for directly connecting said lower shell to the vehicle skin.

5. A structure as in claim 4 wherein said floating nut plate comprises:

nut means for securing said bolting means in place;

retention means for encasing said nut means, said retention means being securely fastened to the inner surface of said skin and constructed so as to permit limited lateral and vertical movement of said nut means, while preventing rotational movement thereof;

said retention means also having an apertured portion in its upper surface and a lower surface comprising a retaining lip thereby allowing said bolting means to penetrate and connect to said nut means; and said bolting means being of such diameter as to form a loose fit through said apertured portion and said skin, thereby reducing the strain between said skin and said tile structure by allowing limited lateral movement of the nut-bolt combination during periods of thermal or mechanical expansion.

* * * * *